United States Patent
Hell et al.

(10) Patent No.: US 7,703,321 B2
(45) Date of Patent: Apr. 27, 2010

(54) LEVEL METER

(75) Inventors: Roland Hell, Riedisheim (FR); Emmanuel Kubler, Bitschwiller-les-Thann (FR)

(73) Assignee: Vega Grieshaber KG, Wolfach (DE)

( * ) Notice: Subject to any disclaimer, the term of this patent is extended or adjusted under 35 U.S.C. 154(b) by 302 days.

(21) Appl. No.: 11/792,310

(22) PCT Filed: Dec. 6, 2005

(86) PCT No.: PCT/EP2005/013058

§ 371 (c)(1), (2), (4) Date: Jun. 26, 2007

(87) PCT Pub. No.: WO2006/061186

PCT Pub. Date: Jun. 15, 2006

(65) Prior Publication Data

US 2008/0110256 A1    May 15, 2008

(30) Foreign Application Priority Data

Dec. 6, 2004  (DE) .......................... 10 2004 058 859
Dec. 20, 2004  (DE) .......................... 10 2004 062 314

(51) Int. Cl.
   *G01F 23/30* (2006.01)
(52) U.S. Cl. .................. 73/306; 73/290 R; 73/290 V
(58) Field of Classification Search .................. 73/306, 73/305, 290 R, 290 V
   See application file for complete search history.

(56) References Cited

U.S. PATENT DOCUMENTS

| | | | | |
|---|---|---|---|---|
| 4,938,590 A | * | 7/1990 | Ishida | 356/5.01 |
| 5,253,521 A | * | 10/1993 | Abramovich et al. | 73/306 |
| 6,028,521 A | * | 2/2000 | Issachar | 340/624 |
| 6,192,754 B1 | * | 2/2001 | Czarnek | 73/313 |
| 6,474,158 B2 | * | 11/2002 | Czarnek | 73/313 |
| 6,588,272 B2 | * | 7/2003 | Mulrooney et al. | 73/324 |
| 6,938,478 B2 | * | 9/2005 | Arias | 73/304 R |
| 7,389,688 B1 | * | 6/2008 | Vander Horst | 73/290 R |
| 7,610,807 B2 | * | 11/2009 | Skinner | 73/319 |
| 2003/0037613 A1 | * | 2/2003 | Mulrooney et al. | 73/323 |
| 2008/0098810 A1 | * | 5/2008 | Skinner | 73/323 |

FOREIGN PATENT DOCUMENTS

WO       00/77480 A2    12/2000

* cited by examiner

*Primary Examiner*—Hezron Williams
*Assistant Examiner*—Rodney T Frank
(74) *Attorney, Agent, or Firm*—The Nath Law Group; Jerald L. Meyer; Stanley N. Protigal

(57) ABSTRACT

The invention relates to a level meter which comprises a tank (1) which can at least be partially filled with a medium and has a bottom (12). The level meter further comprises a first measuring device (2) having a float (23) in the interior (14) of the tank (1) for indicating the level of the medium inside the tank (1). Said measuring system is disposed in the top section of the tank (1) and in parallel to a path of displacement of the float (23). An aligning unit 94) comprises at least one fixing element (41; 43; 45; 47) for fixing at least one lower section (32) of the meter tube (30) on the bottom (12) in relation to the path of displacement of the float (23) and at least one medium passage (42; 44; 46; 48) for allowing the medium to flow between the interior (14) of the tank (1) and the interior of the meter tube (30).

16 Claims, 3 Drawing Sheets

Figure 3A:
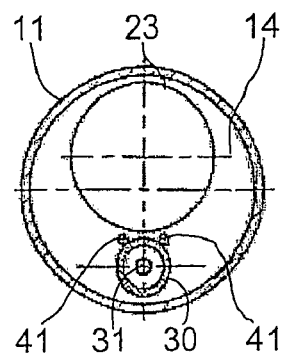

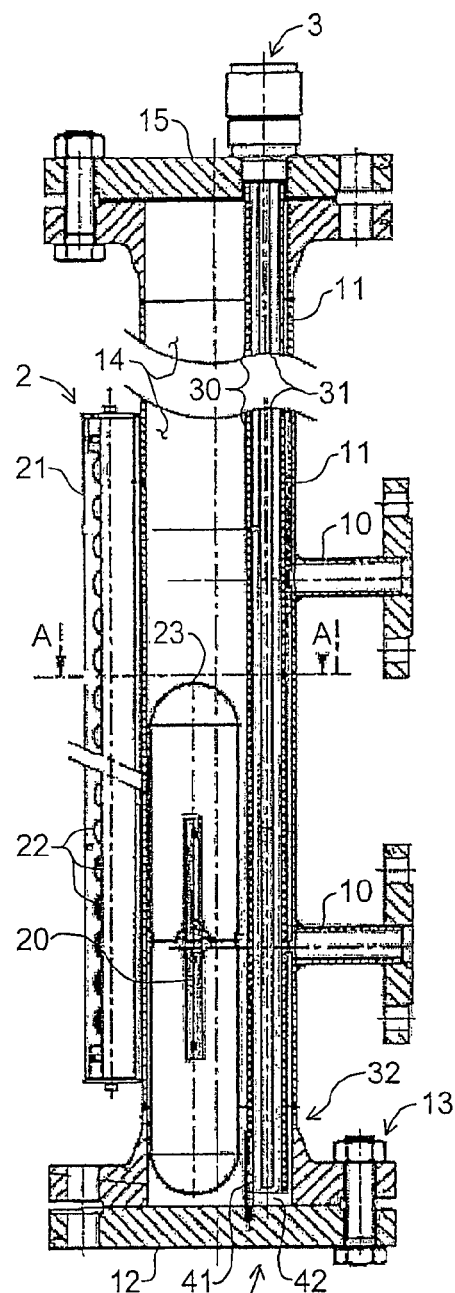
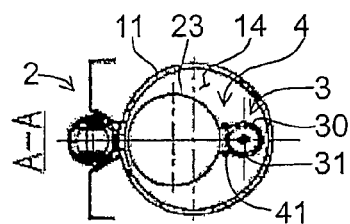

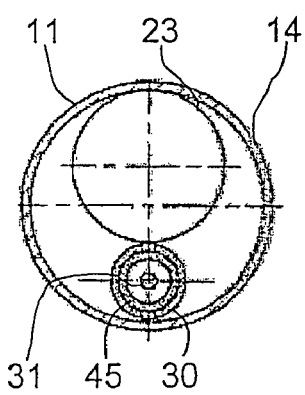
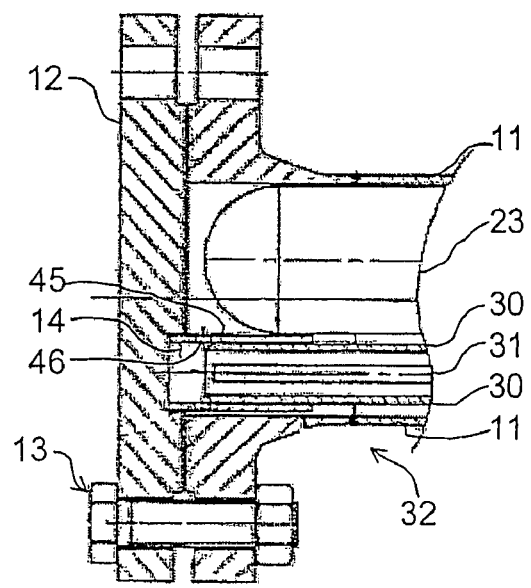
Fig. 5A
Fig. 5B
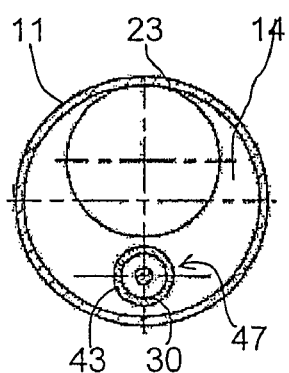
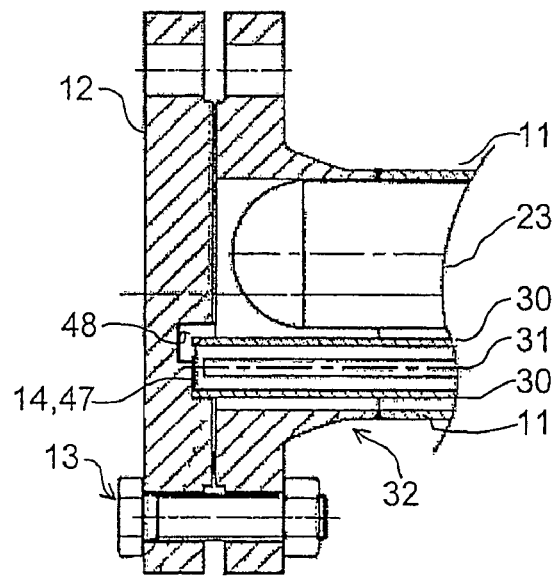
Fig. 6A
Fig. 6B

னVEL METER

This invention refers to a level meter with the overall conceptual characteristics of claim 1.

A level meter which has a container, which can be at least partly filled with a medium and which has a bottom, is known from U.S. Pat. No. 6,588,272 B2. An indicating device with a float in the container serves as a first measuring device for indicating the height or the level of the medium in the container. A second measuring device, which operates according to the TDR (time domain reflectometry) process, has a meter tube and an axial probe within the meter tube in the container for the purpose of a redundant determination of the level of the medium in the container, the measuring system projecting into the container from the top and being positioned parallel to the path of displacement of the float. The level measurement is performed by means of an electronic circuit, which is attached above the measuring instrument. Two tubular connections connect the container to a larger container in which there is stored the medium whose level is to be measured. The fill level of the container thus corresponds to the level in the larger container.

The problem with such a fitting arrangement having an oblong container is the danger of tilting the float between the measuring system and an inner wall of the container if the measuring system that is inserted into the container from the top is not accurately aligned.

In U.S. Pat. No. 6,588,272 B2, a guide plate is directed through the entire pipe to solve this problem, a solution which is disadvantageously complicated to produce and is thus expensive.

A further solution of the problem may consist of providing spacers between the pipe and the float at regular intervals.

This is however impractical, expensive as well as complicated and hardly realizable without impairing the freedom of movement of the float.

It is the object of this invention to improve the aforesaid height or level meter by simple technical means so that it is absolutely impossible for the float to jam.

This object is achieved by a level meter having the characteristics of claim 1.

Accordingly, preferred is a level meter comprising a container, which can be least partly filled with a medium and which has a bottom, a first measuring device with a float in the interior of the container for indicating the level of the medium in the container, a second measuring device having an electrical measuring system, in particular a measuring system operating by the TDR process, said measuring system having a measuring tube in the interior of the container for determining the level of the medium in the container, wherein the measuring system is disposed in the top section of the container and in parallel with the path of displacement of the float and wherein an aligning unit comprises at least one fixing element for fixing at least one lower section of the meter tube at the bottom in relation to the path of displacement of the float and at least one medium passage allowing the medium to flow between the interior of the container and the interior of the meter tube.

Advantageous embodiments are the subject matter of the dependent claims.

A level meter is particularly preferred in which the measuring system consists of the meter tube and a signal rod located in the center of the meter tube.

The meter tube and the signal rod are therefore disposed parallel to the path of displacement of the float.

A level meter is particularly preferred wherein an outer circumference of the meter tube serves as a guide element for the float and which limits the path of displacement laterally.

A level meter is particularly preferred wherein the fixing element extends from the bottom of the container into a space between the meter tube and the path of displacement of the float.

A level meter is particularly preferred wherein two, in particular rod-shaped, fixing elements extend from the bottom of the container into a space between the meter tube and the path of displacement of the float. A level meter is particularly preferred wherein the meter tube does not extend to the bottom in order to form the medium passage.

A level meter is particularly preferred wherein the fixing element extends from the bottom into the interior of the meter tube. A level meter is particularly preferred wherein the fixing element fills the interior of the meter tube in the lower section of the meter tube.

A level meter is particularly preferred wherein the medium passage is formed by at least one opening in the wall of the meter tube.

A level meter is particularly preferred wherein the medium passage leads through the fixing element or through the body of the fixing element as, e.g., a channel.

A level meter is particularly preferred wherein the fixing element is formed by a fixing tube, which extends from the bottom in the direction of the meter tube and which accommodates within itself the outer circumference of the front section of the meter tube. A level meter is particularly preferred wherein the medium passage is formed by an opening in the wall of the fixing tube above the bottom and below the front end of the meter tube.

A level meter is particularly preferred wherein the fixing element is formed by a recess in the bottom, the fixing tube or a front section of the meter tube projecting into the recess in the bottom.

A level meter is particularly preferred wherein the medium passage is formed by a recess in the bottom and/or an opening through the wall of the meter tube.

Figure 3B:
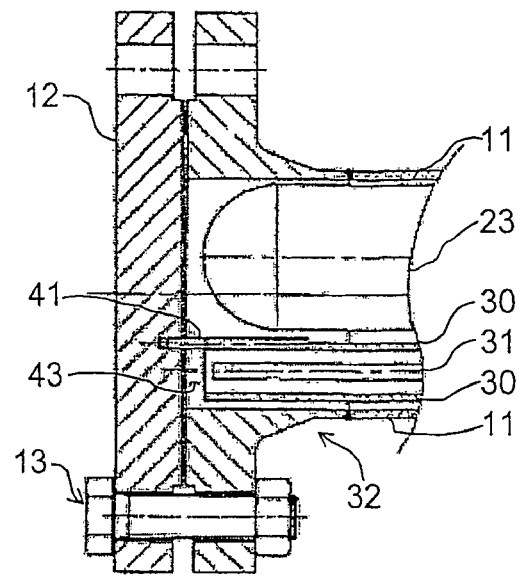
Figure 4A:
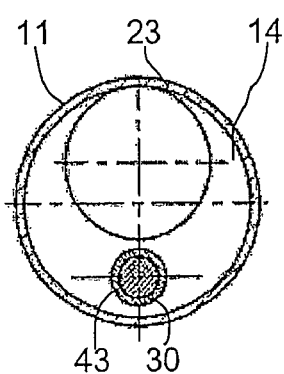
Figure 4B:
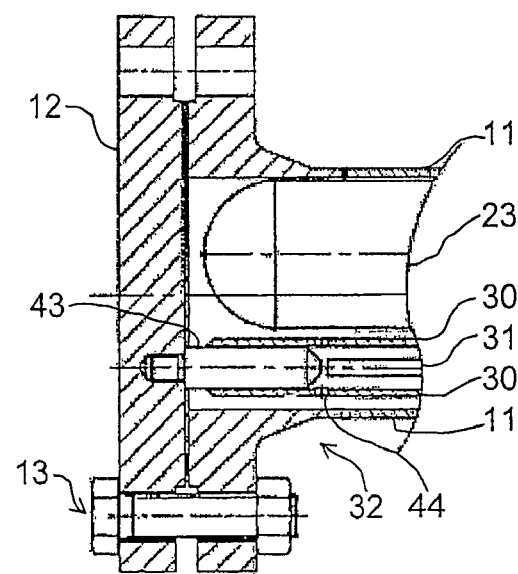

An example embodiment is described below in greater detail by means of the drawing, which shows:

FIG. 1 a longitudinal cross section of the lower section of a level meter;

FIG. 2 a cross section through such a fitting arrangement;

FIG. 3A, 3B a magnified cutout view in accordance with FIG. 1 or FIG. 2;

FIG. 4A, 4B an alternative embodiment represented as in FIG. 3A, 3B;

FIG. 5A, 5B a further alternative embodiment represented as in FIG. 3A, 3B and FIG. 6A, 6B another embodiment represented as in FIG. 3A, 3B.

As shown in FIGS. 1A and 1B, the height or level meter usually comprises an oblong container 1, which, in the mounted state, extends from the bottom upward in a vertical direction. The container 1 is connected via connecting tubes 10 to a larger container, processing tank or the like, whose level is to be controlled or determined. Through an exchange of medium via the pipes 10 in the larger container, the level in the larger container corresponds to the level in the container 1 of the level meter. The medium is usually a liquid, but different media, in particular fluids as well as gaseous media, can also be monitored in principle.

The container 1 essentially consists of a side wall 11 in the form of a peripheral wall into which the two tubes 10 empty. The container 1 is closed from below by a bottom 12, which is for example attached to the side wall 11 by means of a flange connection 13. In the present embodiment, the side wall 11 has a circular cross section. However oval or angular cross sections are also usable in principle.

The interior 14 of the container holds two measuring devices 2, 3 for the determining the level. This is a redundant system comprising a first measuring device 2, which consists of a float 23 which ascends or drops depending on the level in the interior 14 of the container 1. In the present embodiment, the float 23 carries a magnet 20 which interacts with an optical indicating device 21 located on the outside of the container 1.

The optical display unit 21 comprises numerous spheres 22 which can be aligned magnetically and which appear white or black depending on the position of the magnet 20 above or below one the respective spheres 22.

The second measuring device 3 consists of a preferably cylindrical meter tube 30 and a rod-shaped, in particular cylindrically rod-shaped, probe or electrode 31. The electrode 31 preferably extends centrally along the center axis of the meter tube 30. The meter tube 30 and the electrode 31 extend in a vertical direction parallel to the center axis of the interior space 14 and parallel to the path of displacement of the float 23. The meter tube 30 and the electrode 31 are connected to an electrical evaluation device, which operates according to the TDR process. For this purpose, a high frequency microwave pulse is coupled to and conducted along the probe or electrode 31, which can be an electrically conductive cable or a rod. The microwave pulses are reflected by the surface of the filling material and received by electronic analyzer. A microprocessor within the electronic analyzer identifies the reflected level echo, which is then converted into level information. The medium can fill the space between the meter tube 30 and the electrode 31 to the same height as that of the remaining interior 14 of the container 1.

Since the measuring system consisting of the meter tube 30 and the probe or the electrode 31 is attached to the top section of container 1, there exists the risk in principle that the lower section of the meter tube 30 may shift in the direction of the path of displacement of the float 23, so that the float 23 could get jammed between the inner wall of the interior 14 and the middle or lower section of the outer circumference of the meter tube 30. To avoid this, the container 1 contains an aligning unit 4, which defines a lower section 32 of the meter tube 30 at the bottom relative to the path of displacement of the float 23. In order to allow communication of the medium from the interior 14 of the container 1 to the space between the meter tube 30 and the electrode 31, a medium passage 42 allowing the medium to flow between the interior 14 of the container 1 and the interior of the meter tube 30 is formed in the area of the lower section 32 of the meter tube 30. The aligning unit 4 thus essentially consists of at least one fixing element and a medium passage.

In accordance with a first embodiment, which is outlined by FIGS. 1, 2, 3A and 3B, the fixing elements consist of one or preferably two pins 41, which extend, particularly as rod-shaped fixing elements, from the bottom of the container into the space between the meter tube 30 and the path of displacement of the float 23. By means of the pins 41, the meter tube 30 is prevented from penetrating into the path of displacement of the float 23. The design with two such pins 41 that are distanced from each other also allows the side wall of the meter tube 30 to act as a guide for the float 23 in the vertical direction. The medium passage 42 is formed by the fact that the meter tube 30 does not extend to the inside wall of the bottom 12 and it is possible for the medium to pass freely between the pins 41.

In accordance with a second embodiment, which is illustrated by FIGS. 4A and 4B, the meter tube 30 is fixed to the base 12 by means of a peg-shaped fixing element 43, the peg-shaped fixing element 43 extending into the lower interior of the tube 30. The outer circumference of the peg-shaped fixing element 43 preferably corresponds to the inner periphery of the meter tube 30. The medium passage is formed by one or more drilled holes 44, which pass as openings through the wall of the meter tube 30 above the peg-shaped fixing element 43. Correspondingly, the electrode 31 also does not extend toward the bottom 12 as far as the meter tube 30, but rather ends before making contact with the upper end of the peg-shaped fixing element 43. A design is also possible in which, in place of the openings in the wall of the meter tube, a channel leads through the tap. A threaded peg acting as a peg-shaped fixing element 43 in particular also prevents the tube 30 from vibrating when in operation.

A third embodiment is shown in FIGS. 5A and 5B. The fixing element is formed by a fixing tube 45, which is pushed on the outside over the lower section 32 of the meter tube 30 and the lower section of which is attached to or in the base 12. Fastening for example occurs by insertion into a recess 14, which leads from the inside wall of the bottom 12 into the bottom 12. One or more drilled holes 46 serve as medium passages, which holes act as openings leading through the wall of the fixing tube 45, the drilled holes 46 being located above the bottom 12 and below the lower end of the inserted meter tube 30.

A fourth embodiment is shown in FIGS. 6A and 6B. In this embodiment, the meter tube 30 is itself affixed to the bottom 12. The front section of the meter tube 30 extends into a recess 14 which is formed into the bottom 12 by the inside wall of the bottom 12 and which has an inner periphery corresponding to the outer circumference of the meter tube 30. The recess 14 with its walls thus serves as the fixing element. Serving as medium passages are either drilled holes or openings, corresponding to the drilled holes 44 of the second embodiment, or a channel or any other milled slot that is located in the bottom wall and passes below the lower end of the meter tube 30 and connects the interior of the meter tube 30 to the interior 14 of the container 1. With this kind of alignment, the aligning unit is thus essentially formed by configuring the bottom 12 with a recess 14 acting as a fixing element 47 and an additional recess or milled slot 48 acting as a medium passage.

The configuration with a bottom 12, which is subsequently attachable as an independent component to the side wall 11 of the container 1 after the meter tube 30 has been mounted, is particularly advantageous in all embodiments. This leads to a simpler alignment of the meter tube 31 with the corresponding fixing elements of the bottom 12.

In the case of an essentially cylindrical configuration of the container 1 in particular, a flange system comprising numerous flange holes, which serve to fasten the bottom 12 to the side wall 11, offers itself for the purpose of fastening the bottom 12. In particular, a drilled hole can then be specially placed through the opposing flanges in such a manner that it facilitates a desired alignment of the fixing elements(s) 41 on the bottom relative to the measuring devices 2, 3 used in the rest of the container.

Thus, in assembling the container 1, a lid 15 can first be attached, in particular by means of a flange connection, to the top of the side wall 11, so that the second measuring device 3 and a contact or an electronic evaluation device are attached to the lid 15.

Although it was stated in the example that the second measuring device operates via the TDR process, the second measuring system may also be a capacitive measuring system, in which the outside measuring tube constitutes one electrode of a measuring capacitor and the center probe constitutes the other electrode.

The invention claimed is:

1. Level meter comprising
    a container (1), which can be at least partly filled with a medium and which has a bottom (12),
    a first measuring device (2) having a float (23) in the interior (14) of the container (1) for indicating the level of the medium in the container (1),
    a second measuring device (3) having an electrical measuring system with a meter tube (30) in the interior (14) of the container (1) for determining the level of the medium in the container (1), the measuring system being disposed in the top section of the container (1) and in parallel to the path of displacement of the float (23),
    characterized in that
    an alignment unit (4) comprises at least one fixing element (41; 43; 45; 47) for fixing at least a lower section (32) of the meter tube (30) to the bottom (12) relative to the path of displacement of the float (23) and at least one medium passage (42; 44; 46; 48) for allowing the medium to flow between the interior (14) of the container (1) and the interior of the meter tube (30).

2. Level meter according to claim 1, wherein the measuring system comprises a meter tube (30) and a probe or electrode (31) located in the center of the meter tube (30), the meter tube (30) and the probe or the electrode (31) extending parallel to the path of displacement of the float (23).

3. Level meter according to claim 1, wherein the outer circumference of the meter tube (30) serves as the guide element for the float (23) and limits its path of displacement laterally.

4. Level meter according to claim 1, wherein the fixing element (41) extends from the bottom (12) of the container (1) into a space between the measuring tube (30) and the path of displacement of the float (23).

5. Level meter according to claim 1, wherein two, in particular rod-shaped, fixing elements (41) extend from the base (12) of the container (1) into a space between the meter tube (30) and the path of displacement of the float (23).

6. Level meter according to claim 4, wherein the meter tube (30) does not extended to the bottom (12) in order to form the medium passage (42).

7. Level meter according to claim 1, wherein the fixing element (43) extends from the base (12) into the interior of the measuring tube (30).

8. Level meter according to claim 7, wherein the fixing element (43) fills the interior of the meter tube (30) in the lower section (32) of the meter tube (30).

9. Level meter according to claim 7, wherein the medium passage is formed by at least one opening (44) in the wall of the meter tube (30).

10. Level meter according to claim 1, wherein the medium passage (44) leads trough the body of the fixing element.

11. Level meter according to claim 1, wherein the fixing element is formed by a fixing tube (45), which extends from the bottom (12) in the direction of the meter tube (30) and which accommodates within itself the outer circumference of the front section (32) of the meter tube (30).

12. Level meter according to claim 11, wherein the medium passage is formed by an opening (46) in the wall of the fixing tube (45) above the bottom (12) and below the front end of the meter tube (30).

13. Level meter according to claim 1, wherein the fixing device is formed by a recess (14, 47) in the bottom (12), a fixing tube (45) or a front side section (32) of the meter tube (30) projecting into the recess (14, 47) of the bottom (12).

14. Level meter according to claim 13, wherein the medium passage (48) is formed by a recess in the bottom (12) and/or by an opening in the wall of the meter tube (30).

15. Level meter according to claim 1, characterized in that the probe or electrode (31) is an electrically conductive cable or an electrically conductive rod.

16. Level meter according to claim 1, characterized in that the second measuring device (3) comprises a measuring system operating via the TDR process.

* * * * *